(12) United States Patent
Kuno

(10) Patent No.: US 8,091,665 B2
(45) Date of Patent: Jan. 10, 2012

(54) VEHICLE DRIVE SYSTEM AND VEHICLE EQUIPPED WITH IT

(75) Inventor: Hiromichi Kuno, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 581 days.

(21) Appl. No.: 12/226,441

(22) PCT Filed: May 28, 2007

(86) PCT No.: PCT/JP2007/061239
§ 371 (c)(1),
(2), (4) Date: Oct. 17, 2008

(87) PCT Pub. No.: WO2007/142165
PCT Pub. Date: Dec. 13, 2007

(65) Prior Publication Data
US 2009/0090574 A1   Apr. 9, 2009

(30) Foreign Application Priority Data
Jun. 7, 2006   (JP) ................. 2006-158647

(51) Int. Cl.
*B60W 10/04* (2006.01)
*B60W 10/24* (2006.01)
*B60K 1/00* (2006.01)
*H02P 1/54* (2006.01)
*H02P 5/46* (2006.01)

(52) U.S. Cl. ............... 180/65.285; 180/65.31; 318/801; 318/432; 318/51; 318/107; 318/112; 363/71

(58) Field of Classification Search ............... 180/65.21, 180/65.225, 65.23, 65.285, 65.31, 65.245, 180/65.25, 65.265; 318/800, 801, 34, 35, 318/400.01, 779, 799, 432, 400.3, 49, 51, 318/107, 108, 112; 363/40, 55, 65, 71, 175
See application file for complete search history.

(56) References Cited

U.S. PATENT DOCUMENTS

| | | | | |
|---|---|---|---|---|
| 5,099,186 | A * | 3/1992 | Rippel et al. | 318/803 |
| 6,518,736 | B2 | 2/2003 | Sasaki et al. | |
| 6,810,977 | B2 * | 11/2004 | Suzuki | 180/65.25 |
| 6,930,460 | B2 * | 8/2005 | Ishikawa et al. | 318/442 |
| 7,133,602 | B2 * | 11/2006 | Yamada | 388/806 |
| 7,157,869 | B2 * | 1/2007 | Ishikawa | 318/139 |
| 7,398,844 | B2 * | 7/2008 | Ishikawa et al. | 180/65.285 |
| 7,482,779 | B2 * | 1/2009 | Suzuki | 320/106 |
| 2003/0172643 | A1 * | 9/2003 | Suzuki | 60/284 |
| 2005/0116680 | A1 | 6/2005 | Ishikawa et al. | |

(Continued)

FOREIGN PATENT DOCUMENTS

JP   A 5-207664   8/1993

(Continued)

Primary Examiner — John R Olszewski
(74) Attorney, Agent, or Firm — Oliff & Berridge, PLC

(57) ABSTRACT

A vehicle drive system comprises inverters connected electrically with a power supply line and a ground line and controlling the current flowing through each stator coil of each of first and second motor generators, and a switch making or breaking the connection between the neutral of the stator coil of first motor generator and a battery. When the first motor generator is not used but the second motor generator is used, a controller brings the switch into connection state in parallel with voltage conversion operation of a booster unit and controls the inverter to perform voltage conversion operation using the stator coil of first motor generator as a reactor.

14 Claims, 6 Drawing Sheets

U.S. PATENT DOCUMENTS

| | | | |
|---|---|---|---|
| 2006/0091836 A1* | 5/2006 | Oyobe et al. | 318/149 |
| 2008/0067973 A1* | 3/2008 | Ishikawa et al. | 320/104 |

FOREIGN PATENT DOCUMENTS

| | | |
|---|---|---|
| JP | A 8-126121 | 5/1996 |
| JP | A 10-304688 | 11/1998 |
| JP | A 2000-324857 | 11/2000 |
| JP | A 2002-10670 | 1/2002 |
| JP | A 2005-160249 | 6/2005 |
| JP | A 2005-318682 | 11/2005 |
| JP | A 2006-136096 | 5/2006 |

* cited by examiner

VEHICLE DRIVE SYSTEM AND VEHICLE EQUIPPED WITH IT

TECHNICAL FIELD

The present invention relates to a vehicle drive system and a vehicle provided with the system and, more specifically, to an electric moving device having a power source inside a vehicle.

BACKGROUND ART

Recently, environmentally friendly vehicles mounting electric motor as a power source for moving the vehicles forward, such as electric vehicles and hybrid vehicles, come to be popular.

As an example of such a vehicle, Japanese Patent Laying-Open No. 2002-10670 discloses a vehicle in which a plurality of electric motors are driven independently using low DC-voltage to output power and to enhance efficiency of the device.

A hybrid vehicle that adopts a structure having large battery capacity and allowing charging from the outside, cuts operation rates of engine and requires less refueling has been studied. Such a vehicle will be referred to as an externally rechargeable hybrid vehicle.

An externally rechargeable hybrid vehicle is adapted to have a battery of higher output and larger capacity than that of an ordinary hybrid vehicle that allows replenishment of fuel only, to increase the range of EV running, whereby the vehicle predominantly runs as EV as long as the battery charge allows, attaining better mileage and lower emission of carbon dioxide.

By way of example, assume that one drives the externally rechargeable hybrid vehicle to and from work, for a relatively short distance. If charge is performed every night at home, the engine operates only when the state of charge of the battery comes close to zero after a long drive at the weekend, or when he/she steps the accelerator pedal and the vehicle burden increases considerably.

In order to improve the effect of reducing carbon dioxide emission in the externally rechargeable hybrid vehicle, it is necessary to use battery power with higher priority than in a common hybrid vehicle. A parallel type hybrid system or a series/parallel hybrid system, in which engine power can be split and transmitted to the axle and generator by a power split device, however, operates on the premise that engine torque is also used as driving torque at the time of abrupt acceleration or driving at high speed. Therefore, in an externally rechargeable hybrid vehicle, in order to attain comparable maximum driving torque without using engine torque and to enlarge EV running range, it is necessary to enlarge the size of motor and its driving circuitry to realize enhanced performance.

From the viewpoint of energy efficiency and manufacturing cost, however, larger size of driving circuitry and increased number of components should desirably be avoided.

DISCLOSURE OF THE INVENTION

An object of the present invention is to provide a vehicle drive system attaining higher performance without increasing number of components, and to provide a vehicle provided with such a system.

In summary, the present invention provides a vehicle drive system, including: an electric storage; a voltage converting unit performing voltage conversion between positive and negative electrodes of the electric storage and positive and negative power lines; first and second rotating electric machines each including a Y-connected three-phase stator coil; first and second inverter circuits electrically connected to both the positive power line and the negative power line, and respectively controlling currents flowing through stator coils of the first and second rotating electric machines; a connecting unit connecting and disconnecting a neutral point of the stator coil of the first rotating electric machine to and from the electric storage; and a control unit controlling the first and second inverters and the connecting unit. When the first rotating electric machine is not used and the second rotating electric machine is used, the control unit sets the connecting unit to a connected state in parallel with a voltage converting operation of the voltage converting unit, so as to cause the first inverter circuit to perform a voltage converting operation using the stator coil of the first rotating electric machine as a reactor.

Preferably, the control unit causes the voltage converting unit to boost voltage of the electric storage and to supply the boosted voltage between the positive power line and the negative power line, and sets the connecting unit to the connected state to cause the first inverter circuit also to boost the voltage of the electric storage and to supply the boosted voltage between the positive power line and the negative power line.

Preferably, the control unit causes the voltage converting unit to lower voltage between the positive power line and the negative power line and to supply the lowered voltage to the electric storage, and sets the connecting unit to the connected state to cause the first inverter circuit also to lower the voltage between the positive power line and the negative power line and to supply the lowered voltage to the electric storage.

Preferably, the first inverter circuit includes first to third power switching elements respectively connecting ends of first to third phase coils of the Y-connected three-phase stator coil to the positive power line, and fourth to sixth power switching elements respectively connecting the ends of the first to third phase coils to the negative power line.

Preferably, the first rotating electric machine receives mechanical power from an internal combustion engine and generates power, or applies mechanical power to the internal combustion engine to start engine operation. The control unit maintains, at least while the internal combustion engine is in operation, the connecting unit in a disconnected state.

Preferably, the vehicle drive system is mounted on a vehicle using an internal combustion engine and the second rotating electric machine as mechanical power sources. The control unit maintains the connecting unit to the connected state when the vehicle runs without using the internal combustion engine.

More preferably, the vehicle further has a power split device splitting mechanical power among the first and second rotating electric machines and the internal combustion engine, and a clutch mechanism provided between the internal combustion engine and the power split mechanism, for cutting transmission of mechanical power. The control unit maintains the clutch mechanism in a disengaged state when the vehicle runs without using the internal combustion engine.

According to another aspect, the present invention provides a vehicle drive system, including: an electric storage; first and second rotating electric machines each including a Y-connected three-phase stator coil; first and second inverter circuits electrically connected to both the positive power line and the negative power line, and respectively controlling currents flowing through stator coils of the first and second rotating electric machines; a connecting unit connecting either one of the positive and negative electrodes of the electric storage to either one of a neutral point of a stator coil of the first rotating electric machine and a power line, corresponding to the one electrode, of the positive and negative power lines; and a control unit controlling the first and second inverters and the connecting unit. When the first rotating electric machine is not used and the second rotating electric machine is used, the control unit sets the connecting unit to a connected state, so as to cause the first inverter circuit to perform a voltage converting operation using the stator coil of the first rotating electric machine as a reactor.

Preferably, the control unit sets the connecting unit to the connected state to cause the first inverter circuit to boost the voltage of the electric storage and to supply the boosted voltage between the positive power line and the negative power line.

Preferably, the control unit sets the connecting unit to the connected state to cause the first inverter circuit to lower the voltage between the positive power line and the negative power line and to supply the lowered voltage to the electric storage.

Preferably, the first rotating electric machine receives mechanical power from an internal combustion engine and generates power, or applies mechanical power to the internal combustion engine to start engine operation. The control unit maintains, at least while the internal combustion engine is in operation, the connecting unit in a disconnected state.

Preferably, the vehicle drive system is mounted on a vehicle using an internal combustion engine and the second rotating electric machine as mechanical power sources. The control unit maintains the connecting unit to the connected state when the vehicle runs without using the internal combustion engine.

According to a still further aspect, the present invention provides a vehicle including wheels to which mechanical power generated by the second rotating electric machine is transmitted, and any of the vehicle drive systems described above.

According to the present invention, performance of the vehicle during power running and during regeneration can be enhanced, without much increasing the number of components.

BEST MODES FOR CARRYING OUT THE INVENTION

Figure 1:
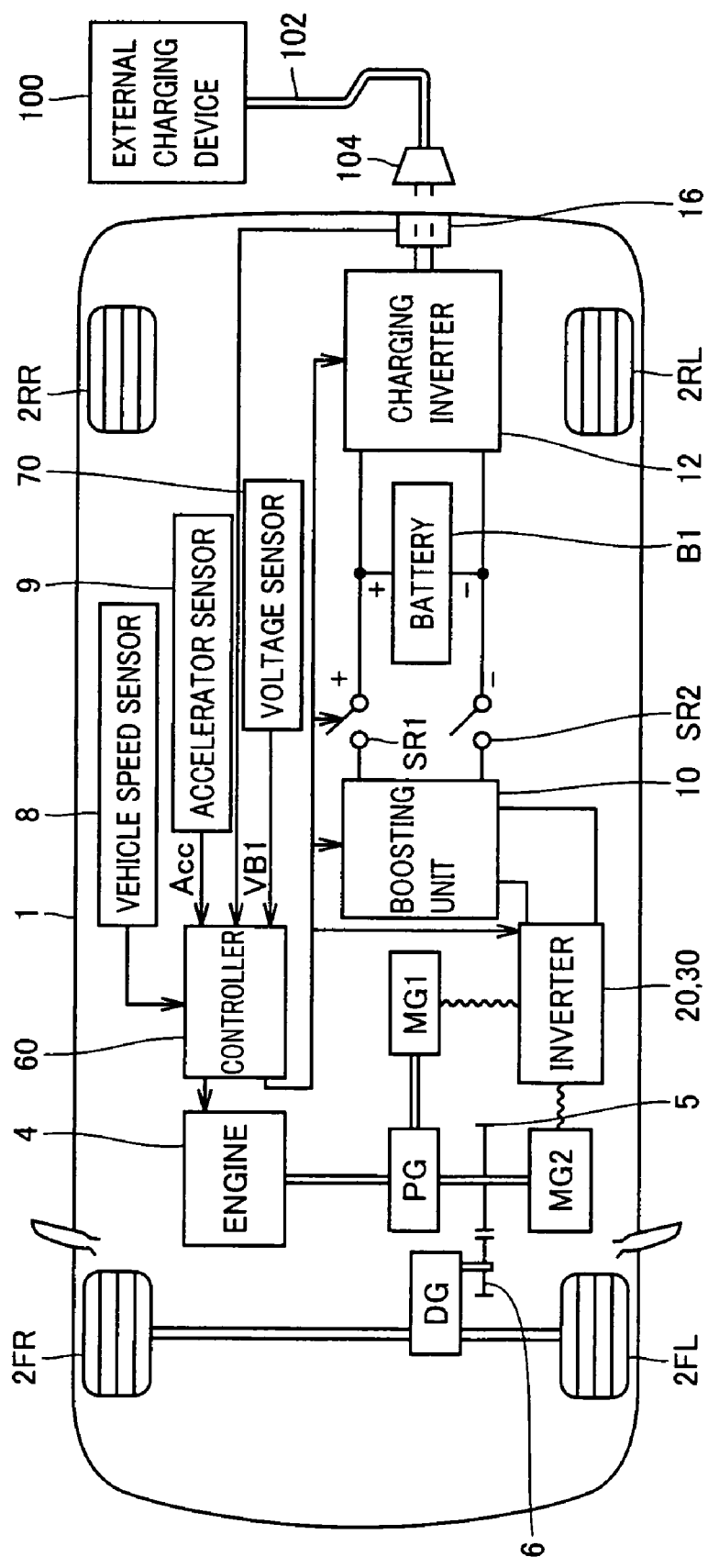
FIG. 1 is a block diagram showing a configuration of a vehicle 1 in accordance with an embodiment of the present invention.

In the following, an embodiment of the present invention will be described in detail with reference to the figures. In the figures, the same or corresponding portions are denoted by the same reference characters and description thereof will not be repeated.

FIG. 1 is a block diagram showing a configuration of a vehicle 1 in accordance with an embodiment of the present invention. Vehicle 1 is a hybrid vehicle, using both motor and engine for driving wheels.

Referring to FIG. 1, vehicle 1 includes front wheels 2FR and 2FL, rear wheels 2RR and 2RL, an engine 4, a planetary gear PG, a differential gear DG, and gears 5 and 6.

Vehicle 1 further includes a battery B1, a boosting unit 10 boosting DC power output from battery B1, and inverters 20 and 30 exchanging DC power to/from boosting unit 10.

Vehicle 1 further includes a motor generator MG1 receiving mechanical power of engine 4 via planetary gear PG to generate electrical power, and a motor generator MG2 having a rotation shaft connected to planetary gear PG. Inverters 20 and 30 are connected to motor generators MG1 and MG2, and exchange AC power to/from DC power from boosting unit 10.

Planetary gear PG operates as a power split device coupled to engine 4 and motor generators MG1 and MG2, splitting power among these.

Planetary gear PG includes a sun gear, a ring gear, a pinion gear meshing with both the sun and ring gears, and a planetary carrier rotatably supporting the pinion gear around the sun gear. Planetary gear PG has first to third rotation shafts. The first rotation shaft is that of the planetary carrier, connected to engine 4. The second rotation shaft is that of the sun gear, connected to motor generator MG1. The third rotation shaft is that of the ring gear, connected to motor generator MG2.

These three rotation shafts are connected to rotation shafts of engine 4 and motor generators MG1 and MG2, respectively. For instance, it is possible to mechanically connect engine 4 and motor generators MG1 and MG2 to the power split device by making the rotor of motor generator MG1 hollow and passing a crankshaft of engine 4 through the center thereof.

The third rotation shaft has gear 5 attached thereto, which gear 5 drives gear 6 to transfer mechanical power to differential gear DG. Differential gear DG receives the mechanical power from gear 6 and transfers the power to front wheels 2FR and 2FL, and also receives rotation power of front wheels 2FR and 2FL and transfers it via gears 6 and 5 to the third rotation shaft of planetary gear PG.

Planetary gear PG determines, in accordance with rotations of two of the rotation shafts, rotation of the remaining one rotation shaft. Therefore, while engine 4 is operated in the most efficient range, the amount of power generated by motor generator MG1 is controlled and motor generator MG2 is driven, so that vehicle speed is adjusted, whereby a vehicle attaining high energy efficiency as a whole is realized.

A reduction mechanism for the rotation shaft of motor generator MG2 may be incorporated inside the planetary gear PG.

Boosting unit 10 boosts the DC voltage received from battery B1, and supplies the boosted DC voltage to inverters 20 and 30. Inverter 20 converts the supplied DC voltage to AC voltage and at the start of engine operation, drives and controls motor generator MG1. After the start of engine operation, the AC power generated by motor generator MG1 is converted to DC by inverter 20 and converted to a voltage appropriate for charging battery B1 by boosting unit 10, whereby battery B1 is charged.

Further, inverter 30 drives motor generator MG2. Motor generator drives, by itself or by assisting engine 4, front wheels 2FR and 2FL. At the time of braking, motor generator performs regenerative operation, and converts rotation energy of wheels to electric power. The obtained electric energy is returned through inverter 30 and boosting unit 10 to battery B1.

System main relays SR1 and SR2 are provided between boosting unit 10 and battery B1, and high voltage is shut-off when the vehicle is not driven.

Vehicle 1 further includes a vehicle speed sensor 8 sensing the vehicle speed, an accelerator sensor 9 as an input unit receiving an acceleration request instruction from the driver and sensing position of an accelerator pedal, a voltage sensor 70 attached to battery B1, and a controller 60 controlling engine 4, inverters 20 and 30 and boosting unit 10 in accordance with accelerator position Acc from accelerator sensor 9 and a voltage VB from voltage sensor 70. Voltage sensor 70 detects voltage VB of battery B1 and transmits it to controller 60.

Vehicle 1 further includes a socket 16 for connection to a plug 104 provided at a tip end of a charge cable 102 extending from an external charging device 100, and a charging inverter 12 receiving AC power from external charging device 100 through socket 16. Charging inverter 12 is connected to battery B1, and supplies DC power for charging to battery B1.

Here, controller 60 controls charging inverter 12 of FIG. 1 such that battery B1 is charged by the AC voltage applied from the outside of the vehicle, based on a state of charge SOC of battery B1 and on a signal IG from an ignition switch (or ignition key).

Specifically, when the vehicle is in a stationary state, signal IG is off and a voltage is applied to socket 16 from the outside, controller 60 determines whether charging is possible or not based on the state of charge SOC of battery B1, and if it is determined possible, drives charging inverter 12. On the other hand, if battery B1 is almost fully charged and charging is determined to be impossible, controller 60 stops charging inverter 12 even if a voltage is being applied to socket 16 from the outside.

Figure 2:
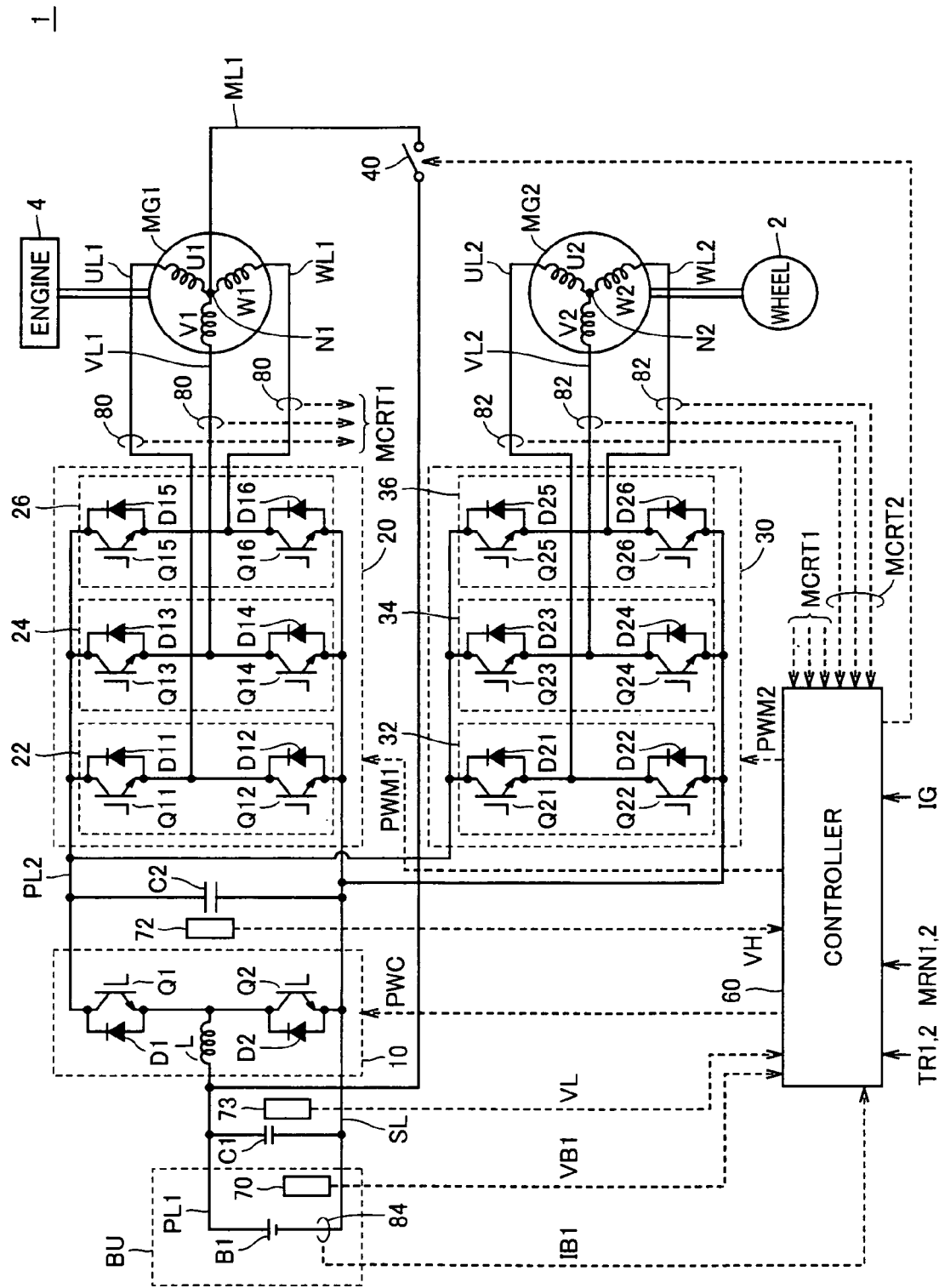
FIG. 2 is a circuit diagram showing details of the block diagram of FIG. 1.

FIG. 2 is a circuit diagram showing details of the block diagram of FIG. 1.

Referring to FIG. 2, vehicle 1 includes a battery unit BU, boosting unit 10, inverters 20 and 30, power lines PL1 and PL2, a ground line SL, U-phase lines UL1 and UL2, V-phase lines VL1 and VL2, W-phase lines WL1 and WL2, motor generators MG1 and MG2, a neutral line ML1, a switch 40, engine 4, and wheels 2.

Motor generator MG1 is incorporated in the hybrid vehicle, operating as a generator driven by the engine and as a motor that can start the operation of engine. Motor generator MG2 is incorporated in the hybrid vehicle as a motor, driving wheels as the driving wheels of hybrid vehicle.

Motor generators MG1 and MG2 are, by way of example, three-phase AC synchronous motors. Motor generator MG1 includes as a stator coil, a Y-connected three-phase coil including U-phase coil U1, V-phase coil V1 and W-phase coil W1. Motor generator MG2 includes as a stator coil a Y-connected three phase coil including U-phase coil U2, V-phase coil V2 and W-phase coil W2.

Motor generator MG1 generates three-phase AC voltage using engine output, and outputs the generated three-phase AC voltage to inverter 20. Further, motor generator MG1 generates a driving force by the three-phase AC voltage received from inverter 20, and starts engine operation.

Motor generator MG2 generates vehicle driving torque by the three-phase AC voltage received from inverter 30. Further, in regenerative braking of the vehicle, motor generator MG2 generates three-phase AC voltage and outputs it to inverter 30.

Battery unit BU includes a battery B1 as an electric storage having a negative electrode connected to the ground line SL, voltage sensor 70 measuring the voltage of battery B1, and a current sensor 84 measuring the current of battery B1.

Battery B1 as the DC power source supplies the DC power to boosting unit 10, and it is charged by DC power from boosting unit 10 that operates as a voltage lowering unit at the time of regeneration. As battery B1, a secondary battery such as a nickel hydride, lithium ion or lead secondary battery may be used. In place of battery B1, an electric double layer capacitor having large capacity may be used.

Battery unit BU outputs the DC voltage output from battery B1 to boosting unit 10. Further, battery B1 in battery unit BU is charged by the DC voltage output from boosting unit 10.

Boosting unit 10 includes a reactor L, npn transistors Q1 and Q2, and diodes D1 and D2. Reactor L has one end connected to power line PL and the other end connected to a node between npn transistors Q1 and Q2. The npn transistors Q1 and Q2 are connected in series between power line PL2 and ground line SL, and receive at control electrodes a signal PWC from controller 60. Between the collector and emitter of the npn transistors Q1 and Q2, diodes D1 and D2 are connected respectively, to cause a current to flow from the emitter side to the collector side.

As the above-described npn transistors and other npn transistors that will be described later in the specification, an IGBT (Insulated Gate Bipolar Transistor) may be used. Further, in place of the npn transistor, a power switching element such as a power MOSFET (metal oxide semiconductor field-effect transistor) may be used.

Inverter 20 includes a U-phase arm 22, a V-phase arm 24 and a W-phase arm 26. U-phase arm 22, V-phase arm 24 and W-phase arm 26 are connected in parallel between power line PL2 and ground line SL.

U-phase arm 22 includes series-connected npn transistors Q11 and Q12, V-phase arm 24 includes series-connected npn transistors Q13 and Q14, and W-phase arm 26 includes series-connected npn transistors Q15 and Q16. Between the collector and emitter of npn transistors Q11 to Q16, diodes D11 to D16 are connected, respectively, to cause current flow from the emitter side to the collector side. Nodes of npn transistors of arms of respective phases are connected through U-, V- and W-phase lines UL1, VL1 and WL1, to coil ends different from the side of neutral point N1 of coils of respective phases of motor generator MG1.

Inverter 30 includes a U-phase arm 32, a V-phase arm 34 and a W-phase arm 36. U-phase arm 32, V-phase arm 34 and W-phase arm 36 are connected in parallel between power line PL2 and ground line SL.

U-phase arm 32 includes series-connected npn transistors Q21 and Q22, V-phase arm 34 includes series-connected npn transistors Q23 and Q24, and W-phase arm 36 includes series-connected npn transistors Q25 and Q26. Between the collector and emitter of npn transistors Q21 to Q26, diodes D21 to D26 are connected, respectively, to cause current flow from the emitter side to the collector side.

In inverter 30 also, nodes of npn transistors of arms of respective phases are connected through U-, V- and W-phase lines UL2, VL2 and WL2, to coil ends different from the side of neutral point N2 of coils of respective phases of motor generator MG2.

Vehicle 1 further includes capacitors C1 and C2, controller 60, voltage sensors 72 to 74, and current sensors 80 and 82.

Capacitor C1 is connected between power line PL1 and ground line SL, and reduces influence of voltage fluctuation on battery B1 and boosting unit 10. Voltage VL between power line PL1 and ground line SL is measured by voltage sensor 73.

Capacitor C2 is connected between power line PL2 and ground line SL, and reduces influence of voltage fluctuation on inverters 20 and 30 as well as on boosting unit 10. Voltage VH between power line PL2 and ground line SL is measured by voltage sensor 72.

Boosting unit 10 boosts the DC voltage supplied from battery unit BU through power line PL1 and outputs the resulting voltage to power line PL2. More specifically, boosting unit 10 stores magnetic field energy in reactor L by the current that flows in response to a switching operation of npn transistor Q2 based on the signal PWC from controller 60. Boosting unit 10 discharges the stored energy, by causing a current to flow to power line PL2 through diode D1, in synchronization with timing at which npn transistor Q2 is turned OFF. By repeating such an operation, boosting is realized.

Further, boosting unit 10 lowers the DC voltage received from either one or both of inverters 20 and 30 through power line PL2 to a voltage level of battery unit BU, based on the signal PWC from controller 60. By this operation, the battery in battery unit BU is charged.

Based on the signal PWM1 from controller 60, inverter 20 converts the DC voltage supplied from power line PL2 to a three-phase AC voltage, and thereby drives motor generator MG1. Thus, motor generator MG1 is driven to generate a torque designated by a torque control value TR1.

Further, inverter 20 converts the three-phase AC voltage generated by motor generator MG1 receiving an output from the engine to a DC voltage based on the signal PWM1 from controller 60, and outputs the converted DC voltage to power line PL2.

Based on the signal PWM2 from controller 60, inerter 30 converts the DC voltage supplied from power line PL2 to a three-phase AC voltage and thereby drives motor generator MG2. Thus, motor generator MG2 is driven to generate a torque designated by a torque control value TR2.

Further, at the time of regenerative braking of the hybrid vehicle implementing vehicle 1, inverter 30 converts the three-phase AC voltage generated by motor generator MG2 receiving the rotational force from driving shaft to a DC voltage based on the signal PWM2 from controller 60, and outputs the converted DC voltage to power line PL2.

The regenerative braking here refers to braking with regeneration through a foot brake operation by a driver of the hybrid vehicle, or deceleration (or stopping acceleration) of the vehicle while regenerating power, by releasing the accelerator pedal during running, though the foot brake is not operated.

Voltage sensor 70 detects battery voltage VB1 of battery B1, and outputs the detected battery voltage VB1 to controller 60. Voltage sensor 73 detects a voltage across opposite ends of capacitor C1, that is, the input voltage VL of boosting unit 10, and outputs the detected voltage VL to controller 60. Voltage sensor 72 detects a voltage across opposite ends of capacitor C2, that is, the output voltage VH of boosting unit 10 (which corresponds to the input voltage to inverters 20 and 30), and outputs the detected voltage VH to controller 60.

Current sensor 80 detects a motor current MCRT1 flowing through motor generator MG1, and outputs the detected motor current MCRT1 to controller 60. Current sensor 82 detects a motor current MCRT2 flowing through motor generator MG2, and outputs the detected motor current MGRT2 to controller 60.

Based on torque control values TR1 and TR2 and motor rotation numbers MRN1 and MRN2 of motor generators MG1 and MG2 output from an ECU (Electronic Control Unit), not shown, the voltage VL from voltage sensor 73, and on voltage VH from voltage sensor 72, controller 60 generates the signal PWC for driving boosting unit 10, and outputs the generated signal PWC to boosting unit 10.

Further, based on the voltage VH and motor current MCRT1 and torque control value TR1 of motor generator MG1, controller 60 generates the signal PWM1 for driving motor generator MG1, and outputs the generated signal PWM1 to inverter 20. Further, based on the voltage VH and motor current MCRT2 and torque control value TR2 of motor generator MG2, controller 60 generates the signal PWM2 for driving motor generator MG2, and outputs the generated signal PWM2 to inverter 30.

Further, control unit 60 further controls switching of conduction/non-conduction of switch 40. When the amount of charges in battery B1 decreases to a certain amount, controller 60 renders switch 40 non-conductive, and allows power generation by motor generator MG1 by activating engine 4. This operation mode will be referred to as a normal HV mode.

When the amount of charges in battery B1 is not much reduced, controller 60 renders switch 40 conductive, and inhibits power generation by motor generator MG1, with engine 4 kept at an inoperative state. The stator coil of motor generator MG1 is used for storing energy as a reactor, and controller 60 controls the signal PWM1 such that the voltage of battery B1 boosted by inverter 20 and the reactor is supplied to inverter 30. This operation mode will be referred to as the EV priority mode.

In the EV priority mode, the boosting unit consisting of inverter 20 and the stator coil of motor generator MG1 operates in addition to the boosting unit 10 and, therefore, it becomes possible to boost the voltage VH to a higher value and to supply larger electric power to motor generator MG2. Therefore, even in EV running, dynamic drive can be attained without any torque from the engine.

Next, variations of switch 40 will be described.

Figure 3:
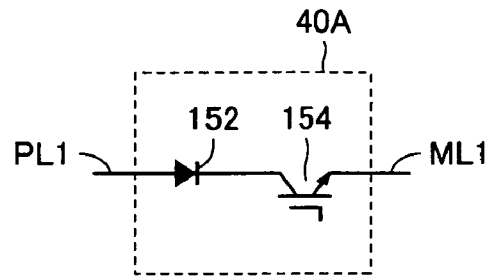
FIG. 3 is a circuit diagram showing a switch 40A as a first exemplary configuration of the switch.

FIG. 3 is a circuit diagram showing a switch 40A as a first exemplary implementation of the switch.

Referring to FIG. 3, switch 40A includes a diode 152 having its anode connected to power line PL1, and an IGBT element 154 having its collector connected to a cathode of diode 152 and its emitter connected to neutral line ML1. Switch 40A allows current flow from power line PL1 to neutral line ML1.

Control electrode of IGBT element 154 is controlled by controller 60 of FIG. 2, and switch 40A is rendered conductive at the time of power running of motor generator MG2 in the EV priority mode. By rendering switch 40A conductive and thereby driving boosting unit 10 in parallel with the boosting circuit formed by the inverter 20 and the reactor of motor generator MG1, dynamic running is realized.

Figure 4:
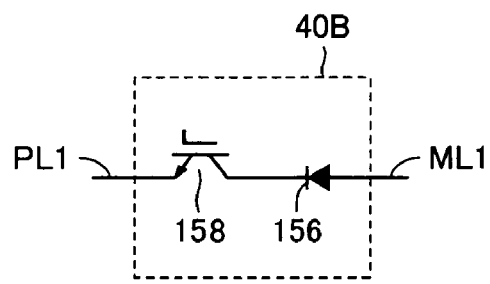
FIG. 4 is a circuit diagram showing a switch 40B as a second exemplary implementation of the switch.

FIG. 4 is a circuit diagram showing a switch 40B as a second exemplary implementation of the switch.

Referring to FIG. 4, switch 40B includes a diode 156 having an anode connected to neutral lint ML1, and an IGBT element 158 having its collector connected to a cathode of diode 156 and its emitter connected to power line PL1. Switch 40B allows current flow from neutral line ML1 to power line PL1.

Control electrode of IGBT element 158 is controlled by controller 60 of FIG. 2, and switch 40B is rendered conductive when motor generator MG2 is in regenerative operation in the EV priority mode. By rendering switch 40A conductive and thereby driving the voltage lowering circuit formed by the inverter 20 and the reactor of motor generator MG1 in parallel with the boosting unit 10 operating as a voltage lowering circuit, recovery ratio improves when there is much regenerative power.

Figure 5:
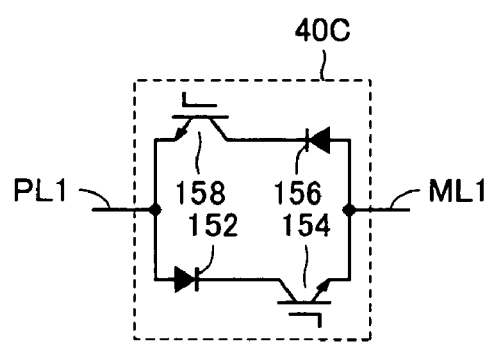
FIG. 5 is a circuit diagram showing a switch 40C as a third exemplary implementation of the switch.

FIG. 5 is a circuit diagram showing a switch 40C as a third exemplary implementation of the switch.

Referring to FIG. 5, switch 40C includes a diode 152 having its anode connected to power line PL1, and an IGBT element 154 having its collector connected to the cathode of diode 152 and its emitter connected to neutral line ML1.

Switch 40C further includes a diode 156 having its anode connected to neutral line ML1, and an IGBT element 158 having its collector connected to the cathode of diode 156 and its emitter connected to power line PL1. Switch 40C allows current flow from power line PL1 to neural line ML1, and allows current flow from neutral line ML1 to power line PL1.

Using switch 40C, it is possible, both in power running and regenerative operation during EV running, to handle large electric power by the motor generator.

Figure 6:
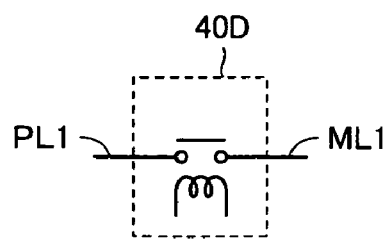
FIG. 6 is a circuit diagram showing a switch 40D as a fourth exemplary implementation of the switch.

FIG. 6 is a circuit diagram showing a switch 40D as a fourth exemplary implementation of the switch.

Referring to FIG. 6, switch 40D includes a relay connecting, by a mechanical node, power line PL1 and neutral line ML1. Conduction/non-conduction of the relay is controlled by controller 60 of FIG. 2. Switch 40D allows current flow from power line PL1 to neutral line ML1, and also allows current flow from neutral line ML1 to power line PL1.

Using switch 40D, it is possible, both in power running and regenerative operation during EV running, to handle large electric power by the motor generator.

Figure 7:
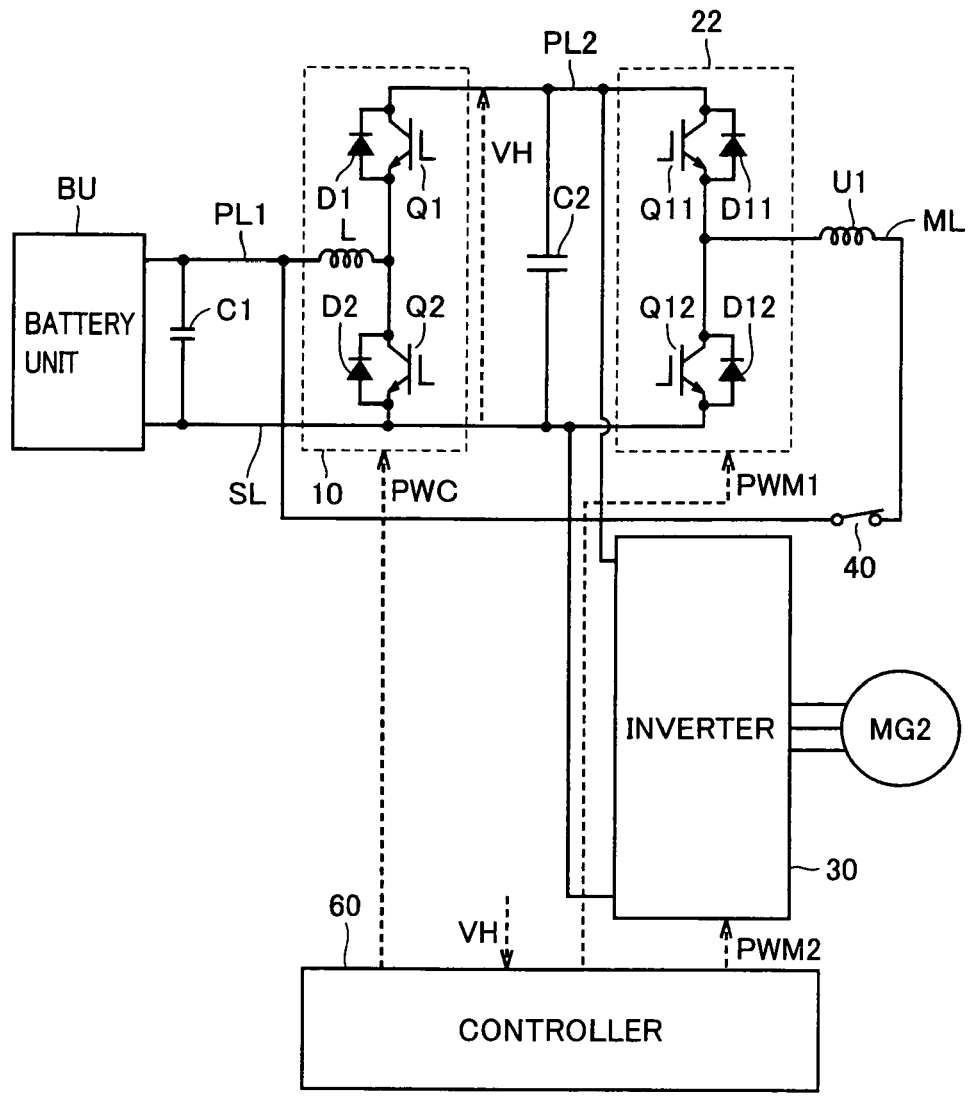
FIG. 7 is an equivalent circuit diagram of a portion performing voltage boosting and lowering operations in the EV priority mode.

FIG. 7 is an equivalent circuit diagram of a portion performing voltage boosting/lowering operations in the EV priority mode.

Referring to FIG. 7, the U-phase arm of inverters 20 and 30 of FIG. 2 is shown as a representative. Further, U-phase coil U1 is shown as a representative of the three-phase coils of motor generator. Other phase may be used in place of the U-phase. Further, only the U-phase may be used, or other phase such as V-phase and W-phase may further be used, in consideration of the required electric power.

As can be seen from FIG. 7, the set consisting of U-phase coil U1 and U-phase arm 22 has a similar structure as boosting unit 10. Therefore, it is possible, for example, to boost and convert a battery voltage of about 200 V to a voltage VH of about 650 V.

At the time of boosting (power running), transistors Q2 and Q12 are subjected to switching control. When transistor Q2 is on, current flows from power line PL1 to ground line SL, and at this time, energy is stored in reactor L. When transistor Q2 is turned off, the energy that has been stored in reactor L is discharged through diode D1 to power line PL2. Similarly, when transistor Q12 is on, current flows from neutral line ML1 to ground line SL1, and at this time, energy is stored in U-phase coil U1. When transistor Q12 is turned off, the energy that has been stored in U-phase coil U1 is discharged through diode D11 to power line PL2.

In order to reduce loss at diodes D1 and D11, transistors Q1 and Q11 may be rendered conductive in synchronization with the conduction period of diodes D1 and D11.

At the time of voltage lowering (regeneration), transistors Q1 and Q11 are subjected to switching control. When transistor Q1 is on, current flows from power line PL2 to power line PL1, and at this time energy is stored in reactor L. When transistor Q1 is turned off, the energy that has been stored in reactor L is discharged because of commutation current flowing through diode D2, whereby battery unit BU is charged. Similarly, when transistor Q11 is on, current flows from power line PL2 to neutral line ML1, and at this time energy is stored in U-phase coil U1. When transistor Q11 is turned off, the energy that has been stored in U-phase coil 1 is discharged because of the commutation current flowing through diode D12, whereby battery unit BU is charged.

In order to reduce loss at diodes D2 and D12, transistors Q2 and Q12 may be rendered conductive in synchronization with the conduction period of diodes D2 and D12.

Preferably, in order to reduce body-felt vibration, a clutch may be provided in the vehicle.

Figure 8:
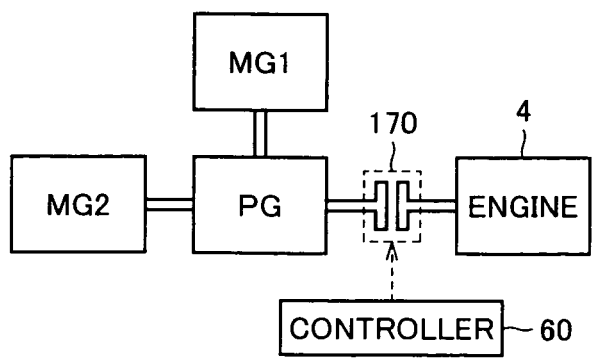
FIG. 8 illustrates a clutch provided for reducing body-felt vibration.

FIG. 8 illustrates the clutch provided for reducing body-felt vibration.

Referring to FIG. 8, the vehicle mounts a planetary gear PG for splitting mechanical power among motor generators MG1, MG2 and engine 4, and a clutch mechanism 170 provided between engine 4 and planetary gear PG for cutting transmission of mechanical power. Controller 60 sets clutch mechanism 170 to the disengaged state, when the vehicle runs without using engine 4 in the EV priority mode.

Motor generators MG1 and MG2 use magnet-embedded type synchronous motors. When the voltage boosting or lowering operation using the stator coil of motor generator MG1 is performed in the EV priority mode, the permanent magnet of rotor in motor generator MG1 may undesirably receive force caused by magnetic flux fluctuation. If such a force is transmitted to engine 4, engine 4 would possibly vibrate, which vibration may be felt by the driver or passenger.

Even when the voltage boosting or lowering operation using the stator coil of motor generator MG1 is performed in the EV priority mode and undesirable torque should be generated in the rotor of motor generator MG1, by disengaging clutch 170, it is possible to prevent the torque fluctuation from being transmitted to and causing vibration in engine 4. Similar effect can be attained if the clutch is positioned between MG1 and planetary gear PG.

Figure 9:
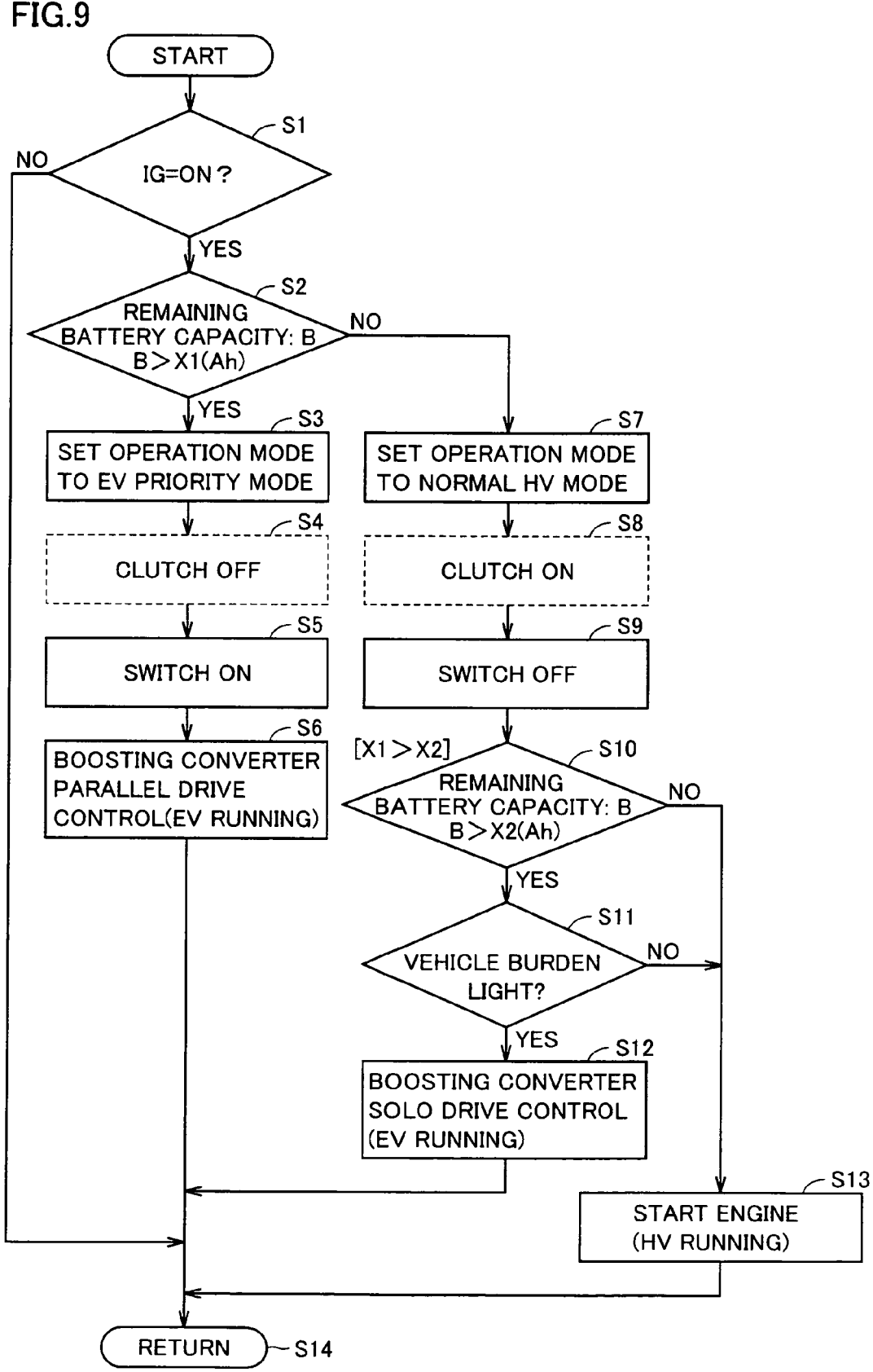
FIG. 9 is a flowchart representing a program structure executed by controller 60.

FIG. 9 is a flowchart representing a program structure executed by controller 60. The process of this flowchart is called from the main routine and executed at every constant time interval or every time prescribed conditions are satisfied.

Referring to FIGS. 2 and 9, first, at step S1, controller 60 determines whether signal IG is ON or not. If the signal IG is not ON at step S1, the process proceeds to step S14, and the control is passed to the main routine.

If the signal IG is ON at step S1, the process proceeds to step S2. At step S2, controller 60 determines whether remaining capacity B of battery B1 is larger than a prescribe threshold value X1 (Ah) or not. The remaining capacity B being larger than the prescribed threshold value X1 means that the battery is almost fully charged. It corresponds, for example, to a state that electric power charged at night from commercial power supply outside the vehicle at home well remains in battery B1, and positive consumption of the electric power is preferable. Therefore, if the remaining capacity B is larger than the prescribed threshold value X1, the process proceeds to step S3, and controller 60 sets the vehicle operation mode to the EV priority mode. In the EV priority mode, activation of engine 4 and power generation by motor generator MG1 are inhibited.

If clutch mechanism 170 such as described with reference to FIG. 8 is provided, at step S4, controller 60 sets the clutch mechanism 170 to the OFF state (disengaged state). Then, the process proceeds to step S5. In a vehicle not provided with clutch mechanism 170, the process directly proceeds from step S3 to S5.

At step S5, switch 40 of FIG. 2 is set to the ON state (conductive state). Thus, a voltage boosting circuit or a voltage lowering circuit is formed by inverter 20 and the stator coil of motor generator MG1.

Thereafter, at step S6, boosting converter parallel driving control in EV running takes place. During power running, the boosting circuit formed by inverter 20 and the reactor of motor generator MG1 and the boosting unit 10 are driven in parallel, and at the time of regeneration, the voltage lowering circuit formed by inverter 20 and the reactor of motor generator MG1 and the boosting unit 10 operating as a voltage lowering circuit are driven in parallel.

On the other hand, if the remaining battery capacity B is not larger than the threshold value X1 at step S2, the process proceeds to step S7. At step S7, controller 60 sets the vehicle operation mode to normal HV mode. In the normal HV mode, engine 4 is activated as needed, and power generation by motor generator MG1 is permitted.

If clutch mechanism 170 such as described with reference to FIG. 8 is provided, at step S8, controller 6 sets the clutch mechanism 170 to the ON state (engaged state). Then, the process proceeds to step S9. In a vehicle not provided with clutch mechanism 170, the process directly proceeds from step S7 to S9.

At step S9, switch 40 of FIG. 2 is set to the OFF state (non-conductive state). Thus, motor generator MG1 comes to be operable as a power generator.

Following step S9, at step S10, controller 60 determines whether the remaining capacity B of battery B1 is larger than a prescribed threshold value X2 (Ah) or not. The threshold value X2 is smaller than the threshold value X1 of step S2.

The remaining capacity B being larger than the prescribed threshold value X2 means that charging of battery B1 is not yet necessary. In that case, it is unnecessary to immediately activate engine 4 and to cause motor generator MG1 to generate electric power. Therefore, the process proceeds to step S11, in which controller 60 determines whether the burden on the vehicle is light or not. The burden on the vehicle is determined based on the accelerator position and the vehicle speed. The burden on the vehicle is larger as the accelerator position is larger and it is larger as the vehicle speed is higher.

At step S11, if the vehicle burden is light, that is, if the vehicle burden determined by the accelerator position and the vehicle speed is smaller than a certain threshold value or if it is in a certain range on a map defined by the accelerator position and the vehicle speed, the process proceeds to step S12. At step S12, EV running is done with engine 4 stopped. Here, different from step S6, the voltage boosting operation or voltage lowering operation is executed solely by boosting unit 10.

If the remaining capacity B of the battery is smaller than the threshold value X2 at step S10, it means battery B1 is almost empty and needs immediate charging. If the vehicle burden is not light at step S11, power from battery B1 only is insufficient. Therefore, if it is NO at step S10 or if it is NO at step S11, the process proceeds to step S13, in which the engine operation is started. Specifically, at step S13, hybrid running starts, in which the motor and the engine are both used for driving the vehicle.

When the process at step S6, S12 or S13 ends, the control is passed to the main routine at step S14.

Based on the description above, the general concept of the present embodiment will be summarized. The vehicle drive system in accordance with the present embodiment includes: battery B1; boosting unit 10 performing voltage conversion between positive and negative electrodes of battery B1 and power line PL2 and ground line SL2; motor generators MG1 and MG2 each including a Y-connected three-phase stator coil; inverters 20 and 30 electrically connected both to power line PL2 and ground line SL, and controlling currents flowing through stator coils of motor generators MG1 and MG2, respectively; switch 40 connecting and disconnecting the neutral point N1 of stator coil of motor generator MG1 to and from battery B1; and controller 60 controlling inverters 20 and 30 and switch 40. When motor generator MG1 is not used and motor generator MG2 is used, controller 60 sets switch 40 to the connected state in parallel with the voltage converting operation of boosting unit 10, so as to cause inverter 20 to perform voltage converting operation using the stator coil of motor generator MG1 as a reactor.

Preferably, controller 60 causes boosting unit 10 to boost the voltage of battery B1 and to supply the voltage between power line PL2 and ground line SL, and sets switch 40 to the connected state and thereby also causes inverter 20 to boost the voltage of battery B1 and to supply the voltage between power line PL2 and ground line SL.

Preferably, controller 60 causes boosting unit 10 to lower the voltage across the power line PL2 and ground line SL and to supply the lowered voltage to battery B1, and sets switch 40 to the connected state and thereby also causes inverter 20 to lower the voltage across power line PL2 and ground line SL and to supply the lowered voltage to battery B1.

Preferably, inverter 20 includes transistors Q11, Q13 and Q15 respectively connecting ends of coils of first to third phases of the Y-connected three-phase stator coil to power line PL2, respectively, and transistors Q12, Q14 and Q16 respectively connecting ends of coils of the first to third phases to the ground line SL.

Preferably, motor generator MG1 receives mechanical power from engine 4 and generates electric power, or applies mechanical power to engine 4 and thereby starts engine operation. At least while engine 4 is in operation, controller 60 maintains switch 40 in the disconnected state.

Preferably, the vehicle drive system is mounted on a vehicle using engine 4 and motor generator MG2 as mechanical power sources. Controller 60 sets switch 40 to the connected state when the vehicle runs not using the engine 4.

The vehicle in accordance with another aspect of the present embodiment includes wheels 2 to which the mechanical power generated by motor generator MG2 is transmitted, and any of the vehicle drive systems described above.

Though examples of vehicle drive system including boosting unit 10 have been described, the present invention is also applicable to a structure not provided with the boosting unit.

Figure 10:
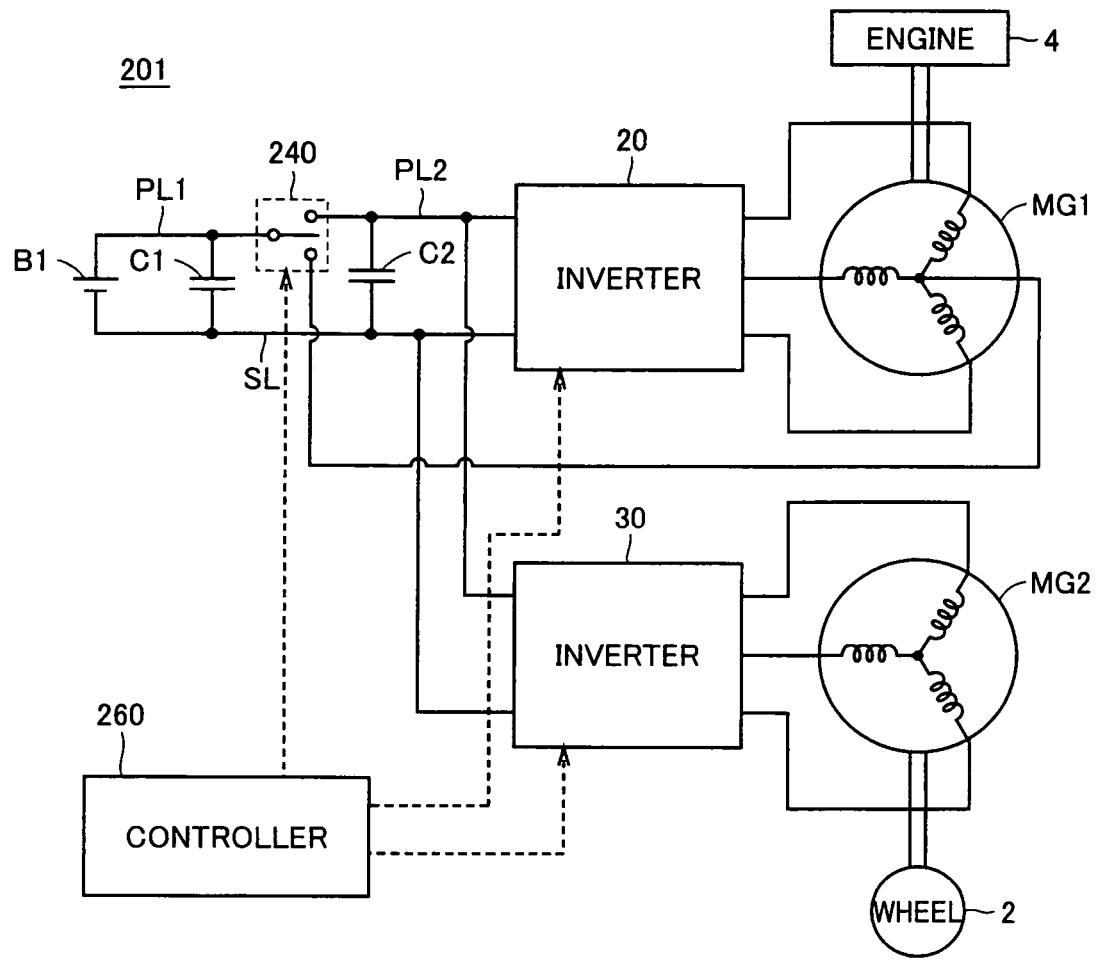
FIG. 10 shows a modification of the embodiment of the present invention.

FIG. 10 shows a modification of the embodiment of the present invention.

Referring to FIG. 10, a vehicle 201 includes battery B1, inverters 20 and 30, power lines PL1 and PL2, ground line SL, motor generators MG1 and MG2, neutral line ML1, a switch 240, engine 4 and wheels 2.

Structural difference between vehicle 1 shown in FIG. 2 and vehicle 201 shown in FIG. 10 is that vehicle 201 is not provide with boosting unit 10, and that vehicle 201 is provided with switch 240 in place of switch 40. Except for these points, vehicles 1 and 201 have similar structures and, therefore description thereof will not be repeated.

Switch 240 is for connecting power line PL1 to either one of power line PL2 and neutral line ML1.

In the normal HV mode, switch 240 connects power line PL1 to power line PL2. Then, the power supply voltage of battery B1 is directly supplied to inverter 30. When engine 4 is activated here, power generation takes place in motor generator MG1, and the generated power is also supplied to inverter 30. Consequently, motor generator MG2 is driven.

The torque of engine 4 is partially used as needed for driving wheels 2, through the power split mechanism.

On the other hand, in the EV priority mode, switch 240 connects power line PL1 to neutral line ML1. Therefore, the stator coil of motor generator MG1 and inverter 20 form a boosting circuit, and thereby it becomes possible to boost the power supply voltage of battery B1, to supply the boosted voltage to inverter 30 and with this, to drive motor generator MG2. Here, it is possible for motor generator MG2 to provide larger output than in the normal HV mode.

The vehicle drive system of the modification shown in FIG. 10 includes: battery B1; motor generators MG1 and MG2 each including a Y-connected three-phase stator coil; inverters 20 and 30 electrically connected both to power line PL2 and ground line SL, and controlling currents flowing through stator coils of motor generators MG1 and MG2, respectively; switch 240 connecting either one of the positive and negative electrodes of battery B1 to the neutral point of the stator coil of motor generator MG1, and to either one of the power lines of power line PL2 and ground line SL that corresponds to the one electrode; and controller 260 controlling inverters 20 and 30 and switch 240. When motor generator MG1 is not used and motor generator MG2 is used, controller 260 sets switch 240 to the connected state, so as to cause inverter 20 to perform voltage converting operation using the stator coil of motor generator MG1 as a reactor.

Preferably, controller 60 sets switch 240 to the connected state and thereby causes inverter 20 to boost the voltage of battery B1 and to supply the voltage between power line PL2 and ground line SL.

Preferably, controller 260 sets switch 240 to the connected state and thereby causes inverter 20 to lower the voltage across power line PL2 and ground line SL and to supply the voltage to battery B1.

Preferably, motor generator MG1 receives mechanical power from engine 4 and generates electric power, or applies mechanical power to engine 4 and thereby starts engine operation. At least while engine 4 is in operation, controller 260 maintains switch 240 in the disconnected state.

Preferably, the vehicle drive system is mounted on a vehicle using engine 4 and motor generator MG2 as mechanical power sources. Controller 260 sets switch 240 to the connected state when the vehicle runs not using the engine 4.

The vehicle in accordance with another aspect of the modification of present embodiment includes wheels 2 to which the mechanical power generated by motor generator MG2 is transmitted, and any of the vehicle drive systems described above.

In the examples in accordance with the present embodiment described above, the invention is applied to a series/parallel hybrid system in which the mechanical power of engine can be split and transmitted to the axle and the generator by the power split device. The present invention, however, is also applicable to a parallel type hybrid vehicle or an electric vehicle, provided that it includes a plurality of rotating electric machines.

For instance, if the invention is applied to an electric vehicle, engine 4 of FIG. 2 or FIG. 10 may be replaced by driving wheels that are driven as needed. In four-wheel drive mode, motor generators MG1 and MG2 may be both used for driving the wheels, and in two-wheel driving mode, only motor generator MG2 may be used for driving the wheels, and the stator coil of motor generator MG1 and inverter 20 may be used for performing voltage boosting or lowering operation.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A vehicle drive system, comprising:
an electric storage;
a voltage converting unit performing voltage conversion between positive and negative electrodes of said electric storage and positive and negative power lines;
first and second rotating electric machines each including a Y-connected three-phase stator coil;
first and second inverter circuits electrically connected to both said positive power line and said negative power line, and respectively controlling currents flowing through stator coils of said first and second rotating electric machines;
a connecting unit connecting and disconnecting a neutral point of the stator coil of said first rotating electric machine to and from said electric storage; and
a control unit controlling said first and second inverters and said connecting unit; wherein
when said first rotating electric machine is not used and said second rotating electric machine is used, said control unit sets said connecting unit to a connected state in parallel with a voltage converting operation of said voltage converting unit, so as to cause said first inverter circuit to perform a voltage converting operation using the stator coil of said first rotating electric machine as a reactor.

2. The vehicle drive system according to claim 1, wherein said control unit causes said voltage converting unit to boost voltage of said electric storage and to supply the boosted voltage between said positive power line and said negative power line, and sets said connecting unit to the connected state to cause said first inverter circuit also to boost the voltage of said electric storage and to supply the boosted voltage between said positive power line and said negative power line.

3. The vehicle drive system according to claim 1, wherein said control unit causes said voltage converting unit to lower voltage between said positive power line and said negative power line and to supply the lowered voltage to said electric storage, and sets said connecting unit to the connected state to cause said first inverter circuit also to lower the voltage between said positive power line and said negative power line and to supply the lowered voltage to said electric storage.

4. The vehicle drive system according to claim 1, wherein said first inverter circuit includes
first to third power switching elements respectively connecting ends of first to third phase coils of said Y-connected three-phase stator coil to said positive power line, and
fourth to sixth power switching elements respectively connecting said ends of the first to third phase coils to said negative power line.

5. The vehicle drive system according to claim 1, wherein said first rotating electric machine receives mechanical power from an internal combustion engine and generates power, or applies mechanical power to said internal combustion engine to start engine operation; and
said control unit maintains, at least while said internal combustion engine is in operation, said connecting unit in a disconnected state.

6. The vehicle drive system according to claim 1, mounted on a vehicle using an internal combustion engine and said second rotating electric machine as mechanical power sources; wherein
said control unit maintains said connecting unit to the connected state when said vehicle runs without using said internal combustion engine.

7. The vehicle drive system according to claim 6, wherein
said vehicle further has a power split device splitting mechanical power among said first and second rotating electric machines and said internal combustion engine, and a clutch mechanism provided between said internal combustion engine and said power split mechanism, for cutting transmission of mechanical power; and
said control unit maintains said clutch mechanism in a disengaged state when said vehicle runs without using said internal combustion engine.

8. A vehicle drive system, comprising:
an electric storage;
first and second rotating electric machines each including a Y-connected three-phase stator coil;
first and second inverter circuits electrically connected to both a positive power line and a negative power line, and respectively controlling currents flowing through stator coils of said first and second rotating electric machines;
a connecting unit connecting either one of positive and negative electrodes of said electric storage to either one of a neutral point of a stator coil of said first rotating electric machine and a power line, corresponding to said one electrode, of said positive and negative power lines; and
a control unit controlling said first and second inverters and said connecting unit; wherein
when said first rotating electric machine is not used and said second rotating electric machine is used, said control unit sets said connecting unit to a connected state, so as to cause said first inverter circuit to perform a voltage converting operation using the stator coil of said first rotating electric machine as a reactor.

9. The vehicle drive system according to claim 8, wherein
said control unit sets said connecting unit to the connected state to cause said first inverter circuit to boost the voltage of said electric storage and to supply the boosted voltage between said positive power line and said negative power line.

10. The vehicle drive system according to claim 8, wherein
said control unit sets said connecting unit to the connected state to cause said first inverter circuit to lower the voltage between said positive power line and said negative power line and to supply the lowered voltage to said electric storage.

11. The vehicle drive system according to claim 8, wherein
said first rotating electric machine receives mechanical power from an internal combustion engine and generates power, or applies mechanical power to said internal combustion engine to start engine operation; and
said control unit maintains, at least while said internal combustion engine is in operation, said connecting unit in a disconnected state.

12. The vehicle drive system according to claim 8, mounted on a vehicle using an internal combustion engine and said second rotating electric machine as mechanical power sources; wherein
said control unit maintains said connecting unit to the connected state when said vehicle runs without using said internal combustion engine.

13. A vehicle, comprising:
a vehicle drive system, including
an electric storage,
a voltage converting unit performing voltage conversion between positive and negative electrodes of said electric storage and positive and negative power lines,
first and second rotating electric machines each including a Y-connected three-phase stator coil,
first and second inverter circuits electrically connected to both said positive power line and said negative power line, and respectively controlling currents flowing through stator coils of said first and second rotating electric machines,
a connecting unit connecting and disconnecting a neutral point of the stator coil of said first rotating electric machine to and from said electric storage, and
a control unit controlling said first and second inverters and said connecting unit, wherein
when said first rotating electric machine is not used and said second rotating electric machine is used, said control unit sets said connecting unit to a connected state in parallel with a voltage converting operation of said voltage converting unit, so as to cause said first inverter circuit to perform a voltage converting operation using the stator coil of said first rotating electric machine as a reactor;
said vehicle further comprising
wheels to which mechanical power generated by said second rotating electric machine is transmitted.

14. A vehicle, comprising:
a vehicle drive system, including
an electric storage,
first and second rotating electric machines each including a Y-connected three-phase stator coil,
first and second inverter circuits electrically connected to both a positive power line and a negative power line, and respectively controlling currents flowing through stator coils of said first and second rotating electric machines,
a connecting unit connecting either one of positive and negative electrodes of said electric storage to either one of a neutral point of a stator coil of said first rotating electric machine and a power line, corresponding to said one electrode, of said positive and negative power lines, and
a control unit controlling said first and second inverters and said connecting unit, wherein
when said first rotating electric machine is not used and said second rotating electric machine is used, said control unit sets said connecting unit to a connected state, so as to cause said first inverter circuit to perform a voltage converting operation using the stator coil of said first rotating electric machine as a reactor;
said vehicle further comprising
wheels to which mechanical power generated by said second rotating electric machine is transmitted.

* * * * *